Nov. 10, 1925.

F. RIES

AIRPLANE 1,560,860

Filed Jan. 29, 1925

INVENTOR,
FREDERICK RIES.
BY Martin P. Smith ATTY.

Patented Nov. 10, 1925.

1,560,860

UNITED STATES PATENT OFFICE.

FREDERICK RIES, OF COMPTON, CALIFORNIA.

AIRPLANE.

Application filed January 29, 1925. Serial No. 5,439.

*To all whom it may concern:*

Be it known that I, FREDERICK RIES, citizen of the United States, residing at Compton, in the county of Los Angeles and State of California, have invented certain new and useful Improvements in Airplanes, of which the following is a specification.

My invention relates to airplanes, and has for its principal object, the general improvement of the existing forms of airplanes, and to provide relatively simple and efficient means for increasing the safety of the occupants of the airplane, particularly in the event that the main propeller and its driving motor fail to function properly during flight.

Further objects of my invention are, to provide one of the wings of an airplane (preferably the upper wing) with an auxiliary wing member, that may be shifted into a position of service at the will of the operator so as to materially increase the surface area of the wing and consequently increasing its sustaining effect and, further, to arrange beneath the upper wing or the one that is equipped with the auxiliary member, a rotary fan which, when operated, draws air from all directions into the space beneath the wing and forcibly directs blasts of air upwardly against the underside of the wing, thereby causing the latter to function after the manner of a parachute and enabling the airplane to be brought to a safe landing by its operator.

With the foregoing and other objects in view, my invention consists in certain novel features of construction and arrangement of parts that will be hereinafter more fully described and claimed and illustrated in the accompanying drawing in which:

Referring by numerals to the accompanying drawings which illustrate a practical embodiment of my invention, 10 designates the body or fuselage of a byplane, 11, the lower plane or wing, 12, the upper plane or wing, 13, the propeller that is mounted at the forward end of the body 10 and which is driven by a suitable motor 14.

In equipping this type of airplane with my improved safety devices, a pocket 15 is formed in the front portion of the upper wing 12, said pocket extending from the front edge of said wing rearwardly and also extending practically the entire length of the wing.

Figure 1:
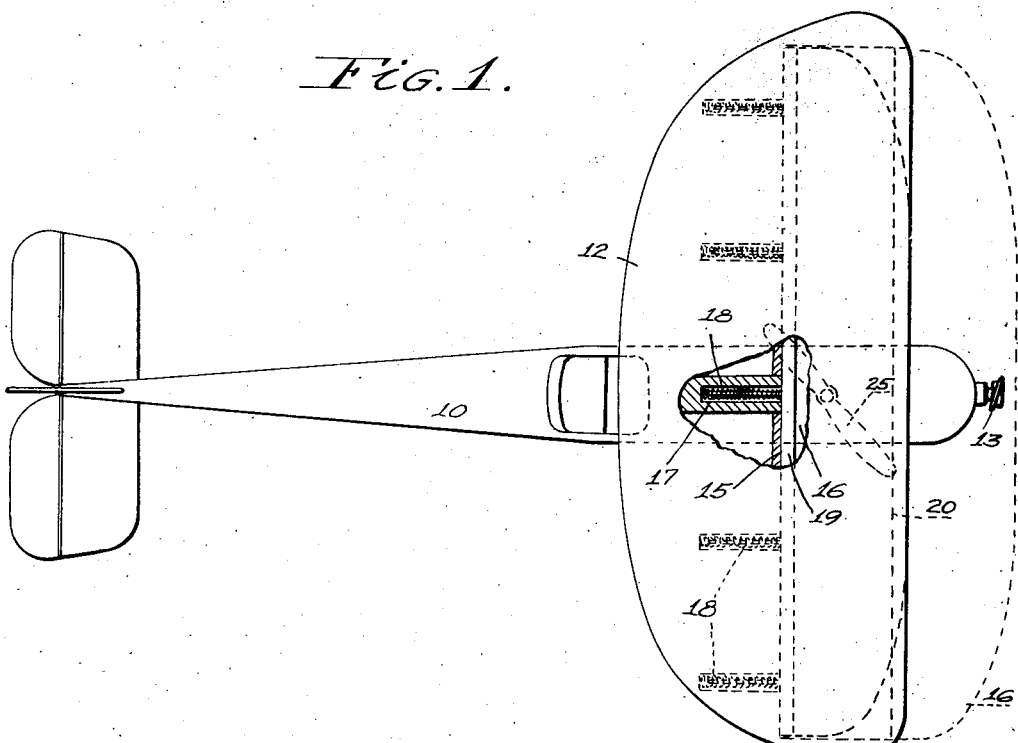
Fig. 1 is a plan view of my improved airplane with parts thereof broken away and in section.
Figure 2:
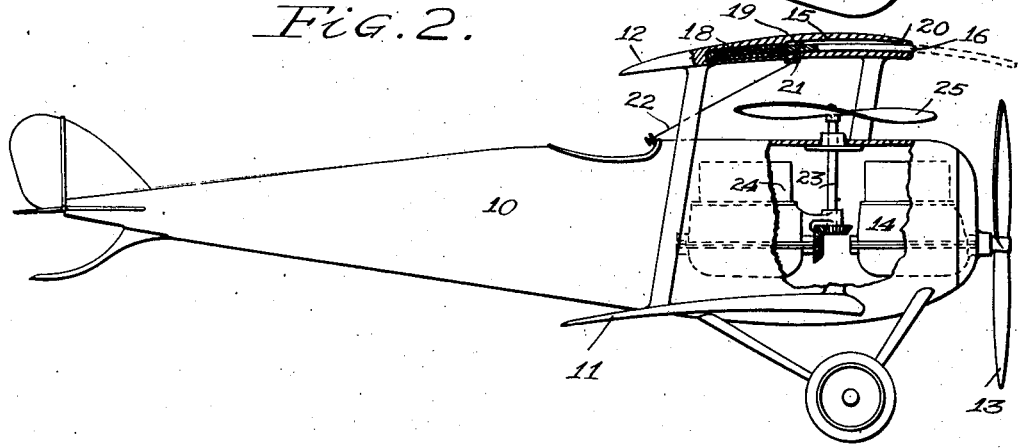
Fig. 2 is a side elevational view with parts broken away and in section.

Arranged to slide freely forwardly and backwardly through this pocket, is an auxiliary wing or plane 16, and arranged in recesses 17, that extend rearwardly in plane 12 from the rear end of pocket 15 are relatively stiff compression springs 18, which when permitted to expand quickly and forcibly move the auxiliary wing forwardly through the pocket so that said auxiliary wing projects a substantial distance in front of wing 12 as shown by dotted lines, Fig. 1.

Auxiliary wing 16 is prevented from moving entirely out of its pocket 15 by a rib 19 on its rear edge and which rib is adapted to engage a shoulder 20 at the forward edge of the pocket 15.

When the auxiliary wing is positioned within its pocket 15, the coil springs 18 are compressed within recesses 17 and said auxiliary wing is retained in its retracted position by a suitable latch 21, that may be released by a pull or cord 22, and which latter extends downward into the fuselage to a point where it may be conveniently engaged by the operator.

Journalled in suitable bearings in the forward portion of body 10 is a vertically disposed shaft 23 that is driven from a suitable motor 24 and the upper end of said shaft carries a fan 25. This fan is constructed so that when rotated at high speed it draws air into the space beneath upper wing 12 and forcibly directs said air upwardly against the underside of said wing and against the underside of the auxiliary wing 16 when the latter is projected forwardly from its pocket 15.

During flight, and while propeller 13 and motor 14 are functioning properly, auxiliary wing 16 occupies a position within its pocket and motor 24 is out so that fan 25 is at rest.

If for any cause, during flight motor 14 and propeller 13 fail to function properly, the operator, in order to prevent a sudden descent to the ground, pulls rod or cable 22 to disengage hook 21 and release auxiliary wing 16 and at the same time starts motor 24 so as to rotate fan 25 at high speed.

As auxiliary wing 16 is thus released, the expansive power of springs 18 act instantly to throw said wing forward so that it projects beyond the front edge of wing 12, thereby providing a sustaining wing of considerable area and the large volume of air directed against the underside of this plane or wing by fan 25 produces a sustaining effect that will enable the operator of the airplane to glide or traverse a gradually inclined path downward to the ground and consequently make a safe landing.

The usual rudders at the rear end of the machine are utilized in the ordinary manner for guiding the airplane vertically and laterally during flight and the weight of the rear portion of the airplane body and the fuel oil stored in reservoirs therein counterbalances the extra weight of the motor 24, fan 25 and auxiliary wing 16. When auxiliary wing 16 is open or in service, it combines with upper wing 12 in forming a relatively large sustaining plane similar to a flattened parachute and the fan 26, when operated drives a relatively large amount of air upwardly against said plane, thereby tending to create a lifting effect to counteract the tendency of the plane to drop or descend at dangerous speed.

Obviously minor changes in the size, form and construction of the various parts of my improved airplane may be made and substituted for those herein shown and described without departing from the spirit of the invention, the scope of which is set forth in the appended claims.

I claim as my invention:

1. The combination with an airplane main wing provided in its forward portion with a pocket that extends practically the entire length of said wing; of an auxiliary wing normally contained within said pocket and compression springs arranged in the rear portion of said pocket and bearing against the rear edge of said auxiliary wing.

2. The combination with an airplane main wing provided in its forward portion with a pocket that extends practically the entire length of said wing; of an auxiliary wing normally contained within said pocket, compression springs arranged in the rear portion of said pocket and bearing against the rear edge of said auxiliary wing, and readily releasable latching means for holding said auxiliary wing within said pocket.

3. The combination with an airplane main wing provided in its forward portion with a pocket that extends practically the entire length of said wing; of an auxiliary wing normally contained within said pocket, compression springs arranged in the rear portion of said pocket and bearing against the rear edge of said auxiliary wing and a fan mounted for operation on the body of the plane and arranged to drive air upwardly against the undersides of the main and auxiliary wings.

In testimony whereof I affix my signature.

FREDERICK RIES.